United States Patent [19]

Luck

[11] 3,915,853

[45] *Oct. 28, 1975

[54] SEWAGE TREATMENT

[76] Inventor: Egon Luck, 61 Thornybrae, Thornhill, Ontario, Canada, L3T3G5

[ * ] Notice: The portion of the term of this patent subsequent to Apr. 2, 1991, has been disclaimed.

[22] Filed: Apr. 1, 1974

[21] Appl. No.: 456,677

Related U.S. Application Data

[63] Continuation-in-part of Ser. No. 174,989, Aug. 25, 1971, Pat. No. 3,801,499.

[52] U.S. Cl. .................. 210/11; 210/16; 210/51; 210/64
[51] Int. Cl.² ............................................ C02C 1/40
[58] Field of Search .............. 210/3, 16, 18, 27, 28, 210/11, 52, 64

[56] References Cited
UNITED STATES PATENTS

| | | | |
|---|---|---|---|
| 913,034 | 2/1909 | McMurtrie | 210/52 |
| 1,083,833 | 1/1914 | Irwin | 210/11 X |
| 2,089,162 | 8/1937 | Goudey et al. | 210/3 |
| 3,145,166 | 8/1964 | Howe | 210/11 X |
| 3,242,055 | 3/1966 | De Lucia | 210/11 X |
| 3,356,609 | 12/1967 | Bruemmer | 210/18 X |
| 3,361,555 | 1/1968 | Herschler | 210/11 X |
| 3,408,289 | 10/1968 | Gustafson | 210/27 |
| 3,423,309 | 1/1969 | Albertson | 210/11 X |
| 3,462,275 | 8/1969 | Bellamy | 210/11 X |
| 3,801,499 | 4/1974 | Luck | 210/11 |

OTHER PUBLICATIONS

Keefer, C. E., Sewage Treatment Works, McGraw-Hill, N.Y., 1940, pp. 308–314.

Primary Examiner—Thomas G. Wyse
Attorney, Agent, or Firm—Raymond F. Kramer

[57] ABSTRACT

A method of treating liquid sewage includes precipitating heavy metals from the sewage, which may have been previously settled, filtered or otherwise treated so as to remove a large proportion of the solids content thereof, raising the pH of the sewage to over 11 and preferably over 12, to destroy pathogenic organisms and to release enzymes from bacteria in the sewage, lowering the pH so that it is in a range in which the enzymes digest components of the sewage, adding microorganisms to the sewage to assist in decomposing organic components thereof, killing the organisms developed and removing them, and neutralizing the sewage solution remaining.

8 Claims, No Drawings

SEWAGE TREATMENT

This application is a continuation-in-part of my patent application Ser. No. 174,989, filed Aug. 25, 1971, now U.S. Pat. No. 3,801,499, granted Apr. 2, 1974.

This invention relates to a method for treating sewage so as to remove from it various organic and inorganic contaminants. More particularly, the invention is of a sequence of operations in which the sewage is treated to remove various impurities and to convert organic materials to gaseous or inoffensive products by biological methods. The treatments are interrelated and are so carried out that a preceding treatment improves the capabilities of a succeeding treatment. By following the present invention, sewage treatment times are greatly diminished, leading to greater throughputs in sewage treatment plants and installations. The product obtained is superior to that which can otherwise be produced economically. Such results are attributable to removing heavy metals which might otherwise inhibit favorable enzymatic and microorganism actions, destroying pathogenic organisms, which could be disease-producing, and which could adversely affect the actions of microorganisms in promoting decomposition of organic materials in sewage, releasing enzymes from killed bacteria to help break down sewage components, including starches, glycerides, proteins and sugars, and adding microorganisms to the sewage so as to promote decomposition of organic materials present after action of the enzymes on the sewage components. By removal of the various inorganic and organic impurities according to the method described, the water is made suitable for a later ion exchange treatment, by which it may be converted to water of drinking quality.

In the ecological decade of the 1970's it has been recognized by many pollution fighters that the capabilities of sewage treatment plants and facilities should be improved in order to make it possible for economic treatment of sewage to remove all or almost all impurities from it, whether inorganic or organic. Such complete or nearly complete removal is important because partially treated sewage still acts as a pollutant and with the increasing population and waste production expected in the future, would result in pollution conditions like those obtaining before treatments were effected. In an ideal situation, the sewage sent to the treatment plant should have components thereof recovered for reuse, as fertilizers, metals and chemicals, with only acceptably clean water and innocuous gaseous products, such as carbon dioxide, nitrogen, oxygen and methane being produced. In the past, although it has been known that purer water could be made from liquid sewage, the costs of the process have been prohibitive. Treatment times have been long, leading to low throughputs, and requiring large and expensive installations. Finally, various components of different sewages have interfered with treatment sequences and processes have had to be modified for different kinds of sewage sent to the plant. Now, in accordance with the present invention, an economic process for making pure, more pure or at least disposable water from sewage has been discovered, with the additional advantage that most of the impurities are separated and are capable of being reused. Throughput times are decreased and rather than having certain processing steps interfere with other such steps, individual operations improve other operations.

In accordance with the present invention, a method for treating aqueous liquid sewage to lower its content of pollutants and preferably, to make it innocuous enough to be dischargeable into rivers, streams, lakes, ground waters or bays, seas or oceans, comprises treating sewage before biological degradation and fermentation thereof by adding to liquid sewage an alkaline compound, such as sodium hydroxide, to precipitate out metals as insoluble carbonates, bicarbonates, hydroxides or oxides, raising the pH thereof to over 11 to destroy pathogenic bacteria and to release enzymes from bacteria in the sewage into solution, removing the insoluble metal compounds from the rest of the liquid sewage and lowering the pH of the sewage to from 3.5 to 6.5, as by addition of hydrochloric acid. More specifically, a preferred method of treating liquid sewage containing inorganic and organic components comprises adding to the liquid sewage an alkaline compound or a mixture of alkaline compounds, selected from the group consisting of sodium carbonate, sodium bicarbonate and sodium hydroxide, to precipitate out metals as insoluble carbonates, bicarbonates, hydroxides or oxides, removing the precipitated materials from the rest of the liquid sewage, adding sufficient alkaline material to the sewage to raise the pH thereof to over 11 to destroy pathogenic and other bacteria in the sewage and release enzymes from the bacteria into solution, lowering the pH of the sewage to from 3.5 to 6.5 by the addition of acid, enzymatically digesting a material or materials selected from the group consisting of starches, proteins, glycerides and sugars with the enzymes released from the bacteria, adding seed bacterial, fungal or yeast organisms or a mixture thereof to the sewage to assist in decomposing organic components thereof, acidifying the sewage after substantial decomposition thereof to kill the organisms developed from those seeded, removing the dead organisms and other insoluble materials which may be present and neutralizing the liquid remaining.

Near the heart of the present invention is the concept that various sewages can be prepared for treatment by removing heavy metal ions and other precipitatable metals from them, sterilizing the sewage by treatment with alkali to raise the pH to a high level, which sterilization also results in rupturing plant and animal cells which may be present to release useful enzymes from them, and enzymatically reacting with other organic constituents of the aqueous sewage solution (or partial suspension) to further prepare such materials for bacterial, yeast or fungal decomposition reactions of known types. Additionally, after decomposition, preferably by oxidation, the remaining sewage is neutralized and ions may be removed with ion exchange resins or similarly functioning substances. By following the present method, it is not necessary to vary greatly the procedures presently followed in sewage treatment and a substantially common microorganism treatment may be employed for various sewages because the impurities present which may adversely affect such treatments have been removed and the sewage has been prepared by enzymatic action for microorganism treatment.

It is taken as a rule of thumb that for every person there is produced approximately 100 gallons of domestic sewage a day. Additionally, industrial sewage is often mixed with domestic sewage and is sent to the sewage treatment plant. The biological oxygen demand (BOD) of the liquid sewage being treated by the present method is typical of sewage produced domestically or with average industrial wastes mixed in with it. Suspended solids content of such sewage will usually be from 0.005 to 0.1% by weight, typically being about 0.01 to 0.05%. Normally, preliminary treatment is employed to remove large pieces of waste materials, before secondary treatment, to which the present invention is primarily directed, is effected. Thus, screens may be used to remove some such materials and velocity control may be employed to take out gritty materials, which will drop out of the flowing liquid while lighter solids will be carried with it. Subsequently, sedimentation may be used, employing tanks or lagoons, so as to settle out solids or sludge, or centrifugation or filtration may be effected. Because dissolved solids are not removed by settling and some very finely divided solids will remain suspended, and because only about half of the suspended solids are removable by sedimentation, a substantial proportion of the BOD will be left in the sewage. The resulting aqueous sewage can be chemically treated with aluminum sulfate, ferric chloride, ferric sulfate, ferrous sulfate, alum and lime. It may be filtered through sand or be treated by an activated sludge process or other useful mechanism to produce a clean effluent.

The prepared liquid sewage, usually containing the amount of solids indicated or 20 to 80% thereof, and also containing metal ions, usually in quantity from 1 to 10,000 parts per million, more often from 10 to 1,000 p.p.m., and containing dissolved copper, iron, zinc, lead, aluminum, mercury, calcium, barium and/or bismuth salts, is treated with an alkaline compound to precipitate out the metal as an insoluble carbonate, bicarbonate, hydroxide, oxide or other compound and such compound is setted out of the rest of the sewage. The alkaline material employed will usually be an alkali metal carbonate, bicarbonate, or hydroxide or a mixture thereof and preferably the sodium salts are used. Also preferably, if a salt is used it will be a carbonate, although bicarbonates may also be useful. The quantity of carbonate used will be sufficient to react with the metal present. An excess may be employed and is desirable to help raise the pH of the sewage, as will be described below. Generally, enough of the carbonate or bicarbonate will be used to have made the sewage solution from 0.01 to 0.5 molar if it did not react with the metals or other materials present. The addition of the carbonate or bicarbonate (replaceable with hydroxide or oxide of a suitable metal), will be at a reasonable temperature, preferably in the 10°C. to 50°C. range and the treatment time, including settling time, will be one hour to 24 hours, preferably from 6 to 12 hours. For best operation with the other steps of the process, the temperature will often be from 25°C. to 40°C.

Removal of the precipitated heavy metal and other insoluble metal carbonates, bicarbonates, oxides and hydroxides, and other insoluble products formed by the carbonate or carbonate-hydroxide treatment may be effected by any known means, including mechanical scrapers, decanters, and even, in some cases, centrifuges. Also, the supernatant liquid may be moved onwardly to another lagoon or tank for subsequent treatment, leaving the residue behind.

After completion of treatment to precipitate out the metal salts, the contents of such salts in the liquid will be dramatically reduced to from 1 to 10% or less of the concentration initially present. Of importance is the discovery that the copper ion concentration may be lowered to less than 1 p.p.m. and often to less than 0.5 or 0.1 p.p.m. In a similar manner, other metal ions which would interfere with the organic decomposition processes to be described will be removed.

The carbonate treatment of the liquid sewage may be accompanied or followed by alkaline treatment to raise the pH thereof to a level sufficiently high to kill pathogenic bacteria that may be present. Included among such bacteria that will be destroyed are *Streptococcus pyogenes, Staphylococcus aureus, Bacillus anthracis, Escherichia coli, Shingella dysenteriae, Clostridium perfringens* and *Mycobacterium tuberculosis*. The treatment to destroy the pathogenic bacteria will sometimes follow the removal of the heavy metal ions but is preferably conducted simultaneously with such removal, in which case the bodies of the pathogenic organisms may be at least partially settled out with the metal precipitates, if so desired. To obtain the desired high pH, over about 11 and preferably from 12 to 13.5, sodium carbonate or sodium hydroxide or mixtures thereof may be employed. The quantity of hydroxide present will normally be sufficient to produce the mentioned pH's and will generally be from 0.01 to 0.5 molar, preferably from 0.05 to 0.2 molar in the sewage, with additional material being employed when there are further reactions with other substances present, such as metal ions and acids.

The high pH produced by the addition of hydroxide carbonate and bicarbonate sterilizes the sewage by destroying bacteria and other organisms present in it. When so destroyed the bacteria release enzymes. Also, the caustic causes breakdowns of cell walls of proteinaceous, amylaceous, lipophilic, saccharidic and other materials present and from these enzymes are also spilled over or released. The enzymes are usually soluble and therefore are not removed with the dead organisms. To make the enzymes effective in digesting the various organic materials in the sewage it is important that the sewage pH lowered from the highly alkaline conditions mentioned, at which most enzymes are ineffective in the present media. A preferred range of pH's for enzymatic activity is from 3.5 to 6.5 although in some cases pH's outside this range may be employed. Normally, the pH's will not be lower than 2.5 nor higher than 9. To lower the pH, various buffer salts or acids may be added to the alkaline sewage, e.g., sulfuric acid, sodium bisulfate, carbonic acid, but it is highly preferred to employ hydrochloric acid. The amount used will be sufficient to reach the desired pH range, which is preferably from 4 to 6 and most preferably from 4.5 to 5.5 or 4.9 to 5.5 for the enzymes most desirably used. The hydrochloric acid forms sodium chloride (or $Na^+$ and $Cl^-$) with the sodium hydroxide or sodium carbonate alkalizing agent and the sodium chloride has been found to be additionally useful in promoting enzymatic and bacterial activity in the sewage. The amount of hydrochloric acid employed will normally be from 0.01 to 0.5 molar and will preferably be sufficient to produce a 0.01 to 0.5 molar concentration of sodium chloride in the sewage. Such concentration is desirably at least 0.05 molar for the enzymatic digestion stage operations. The temperature of enzymatic digestion or destruction of animal and vegetable cells in the sewage is usually from 25° or 30° to 60°C., preferably from about 30° to 40° or 45°C. and the action takes place over from ½ hour to 12 hours, preferably from 1 to 6 hours.

In addition to the enzymes released from the organic materials destroyed by alkaline treatment, other enzymes may be added at this point. Among the useful enzymes are those classified as oxidoreductases, transferases, hydrolases, lyases and isomerases. Materials of this type include, diastase, urease, pepsin, trypsin, papain, amylases, proteases, lipases, bromelain, glycose oxidase and cellulotic enzymes. These may be released from the killed bacterial and from vegetable and animal matter in the sewage, which matter may be destroyed by alkaline or enzymatic attack. Thus, the enzymatic treatment is self-reinforcing, since some enzymes may attack organic structures and release enzymes from them.

After completion of enzymatic treatment, which breaks down starch, glyceride, protein, cellulose and sugar molecules, the sewage has been prepared for bacterial, fungal or yeast treatment to further convert the decomposition products to innocuous materials. The bacteria employed may be aerobic or anaerobic and in such treatments efforts are made to aerate the sewage or prevent contact with air, depending on the organisms used. The conditions of attack on the pre-treated sewage will be those favoring growth of the microorganisms employed. Usually it will be desirable that the pH be somewhat acidic but in some cases mildly alkaline pH's may be employed. Often the pH range of 5 to 9 is preferred, although more acidic pH's, to about 3.5, may be used, especially when yeasts are used. The temperature of microorganism treatment will usually be in the 25° to 50°C. range and the time of treatment will be from 12 to 36 hours, preferably about 20 to 30 hours. The temperature is most preferably controlled to about 30° to 40°C. for most bacteria and temperatures high enough to kill the bacteria or substantially prevent their growth will not be employed. Among the organisms that may be added there may be mentioned the heterotrophs, although autotrophs may be utilized, too. Among such bacteria that may be useful are included *proteus vulgaris*, actinomycetes, including streptomyces, *streptococcus lactis, bacillus felsineus, clostridium butyricum*, nitrosococcus, nitrobacter, acetobutylicum, *lactobacillus delbrueckii, lactobacillus casei*, thiobacillus, *lactobacillus plantarum* and other similar types. More bacteria are useful in these reactions and only a few of them are named above. In addition to the bacteria, various microorganisms may be employed, including protozoa, algae, viruses, fungi, including yeasts, and bacterial spores. Most important of these are the fungi and yeasts, including saccharomyces cerevisiae, penicillium chrysogenum, aspergillus niger, found especially useful in the decomposition of sugars and aspergillus orygae. The amounts of the microorganisms utilized are not of vital importance. In a proper environment they multiply quickly, doubling about every 30 minutes. However, in normal use the amount of bacteria charged to the sewage will, on a weight basis, be from 0.01 to 1% of the organic material which it is to attack. In addition, bacterial and other microorganisms' growths in sewage are excellent and even the precipitation of metals by initial treatment with carbonate and caustic leaves enough of these present to support bacterial growth, although it does not leave a sufficient proportion of copper or other harmful metals present to prevent such growth or interfere with enzymatic or other decomposition reactions.

After bacterial treatment is complete, the bacteria and other microorganisms are killed, usually by acidification with hydrochloric acid in approximately the amounts previously utilized to lower the pH of the sewage. Organism deaths occur at pH's lower than 5, usually lower than 4.5 and sometimes even more hydrochloric acid is employed so as to lower the pH further, especially in the cases of some yeasts. Heat may be employed, if desired, to aid in killing the organisms (it could also be used in the earlier sterilization step). Usually, for heat sterilization a temperature higher than 60°C. is needed, e.g., 75°C. for 1 hour. Before killing the organisms, some may be removed so as to serve as inoculi for other batches of sewage to be treated. Generally, the precent removed will be from 0.1 to 10%, preferably from 1 to 5%.

After killing of the bacteria the dead organisms and other insoluble materials are allowed to settle out in a settling tank or lagoon, usually for 6 to 48 hours, preferably for 24 to 40 hours. In such settling operation the water of the sewage is clarified and the dead bacteria and other organic matter may be removed and utilized for fertilizer. The temperature of settling is not of vital importance but normally will be in the 20° to 50°C. range. Of course, instead of settling, other separation techniques may be employed.

After removal of the insolubles and sometimes even during this settling process, the pH of the sewage water will preferably be adjusted by the addition of sodium hydroxide to about 7, e.g. 6.5 to 7.5. The neutralized water may then be discharged into streams or is ready for ion exchange treatment, in which inorganic ions and non-biodegradable materials are removed. Such treatment may be effected at about room temperature or in the 20° to 40° or 50°C. range by passing the clear water, which may be filtered to assure clarity, through beds or units of ion exchange agents, either sequentially through anion and cation exchangers or through a combination anion-cation exchanger. In practice it has been found that the Amberlite resins of Rohm and Haas are excellent for satisfactorily removing almost all of the dissolved ionic materials, which may include some synthetic detergents of the branched alkyl aryl sulfonate type, $Na^+$, $Cl^-$, $PO_4^\equiv$, $NH_4^+$, $NO_3^-$ and other ions. In addition to the Amberlites, various other ion exchange materials may be employed, including 10% divinylbenzene (DVB) resins (the rest of the resin is styrene) containing entrapped sulfonic acid and quaternary ammonium salt groups in cross-linked structures. The classes of ion exchange resins of the cation, anion and dual types are well-known and therefore need not be discussed further herein. In addition to ion exchange resins, various other materials of similar properties may be employed, including aluminosilicates, zeolites, sulfonated coals and certain clays, e.g., treated bentonites. After removal of ions from the water obtained from the sewage treatment, the ion exchange resin may be regenerated in known manner and used again. It is often found that during the regeneration step the concentration of ionized material obtained is greater than originally charged in the sewage and hence less evaporation or other water removal is needed to obtain the ionizable material in dry form.

As a result of the practice of this invention there is obtainable a complete process for producing acceptably dischargeable water or a drinking quality water from sewage in a comparatively short time, e.g., 3 days, instead of 14 to 28 days which might otherwise be required with conventional treatments. The control of the conditions of enzymatic, bacterial and microorganism attacks on the organics present in the sewage are such that decomposition rates are obtainable up to 30 times those of some ordinary processes. As a result, speedy treatments may be effected and the water discharged from the sewage treatment plant may be so pure as not even to require chlorination or any other sterilization treatment. The metals are recoverable, as are the organic compounds, useful as fertilizers, and the soluble inorganic salts. Some of these may be reused in the process or may be employed as feeds for the manufacture of acids or alkalizers employed.

The following example illustrates the invention but is not to be considered as limiting. Unless otherwise mentioned, all parts are by weight and all temperatures are in °C.

EXAMPLE

One thousand parts of municipal sewage containing about 50% normal domestic sewage, having a solids content of 0.05% of organic material after removal of large waste materials and grit, and containing about half soluble and half dispersed components in an aqueous medium, has a major part of the dispersed portion separated from it by settling for about a day in a quiescent lagoon or tank. The liquid medium, containing soluble organic and inorganic materials and very finely divided organic substances, has a biological oxygen demand of about 300 p.p.m. It contains over 5 p.p.m. of copper and other metal salts in similar quantities, except for greater proportions of iron and zinc salts. The organic components include the usual lipids, proteinaceous and amylaceous components, cellulosics and bacteria, many of which are pathogenic, fungi and sugars.

To the sewage is added enough sodium carbonate to increase the molarity thereof in the sewage to 0.1, provided that none had reacted with metal ions to form insoluble salts. Instead of sodium carbonate, in some experiments equimolar parts of sodium bicarbonate and sodium carbonate are used. The pH of the sewage is raised to about 11 and heavy metal ions, including copper, and alkaline earth ions, including calcium, are precipitated out, settled out and separated from the liquid medium by passing the liquid on to a subsequent treating stage. Treatment takes less an hour, with the sewage temperature at 37°C. Settling takes about 10 hours. Subsequent to removal of the metal ions (copper concentration is decreased to less than 0.5 p.p.m.) the liquid is treated at the same temperature with enough of an aqueous solution of sodium hydroxide to raise the pH of the sewage liquid to about 13. The caustic used is an impure material not marketable as pure sodium hydroxide. The caustic and hydrochloric acid to be used subsequently are both impure, to lower the cost of treatment. The amount of caustic used is about enough to make the sewage 0.1 molar in $OH^-$ concentration. In about 2.5 hours substantially all the pathogenic bacteria present, including *Staphylococcus aureus* and *Escherichia coli*, are destroyed and cell structures of other organic materials present, such as cellulosics, starches and fatty materials are weakened or broken. As a result of the caustic treatment enzymes are released from the bacteria and other microorganisms and other organic materials present in the sewage. Because of the removal of debilitating amounts of metal ions, which might inhibit enzymatic action otherwise, the enzymes are active and ready to decompose starches, cellulosics, sugars and proteins at the proper pH.

Instead of employing separate steps to treat the sewage with carbonate(s) and caustic the steps are preferably combined, with the caustic being added with the carbonate or within an hour after its addition. In some cases settling times of as little as an hour will remove almost all of the precipitated metal salts, plus a substantial proportion of the dead bacteria and other materials attacked by the hydroxyl ions present. Sometimes caustic may be used instead of carbonates.

Because the enzymes are not active at the high pH's of the sewage after caustic addition, enough hydrochloric acid is added to neutralize the caustic and carbonate alkalinity and produce a pH of 5.2. Generally about enough HCl to make the sewage 0.1 molar will be sufficient to neutralize the caustic but because of the desire to make the medium acidic and because of the presence of hydroxyl ion from the excess carbonate reagent, additional HCl is employed, enough to make the molarity of $Cl^-$ from the HCl about 0.15. This concentration, together with HCl or $Cl^-$ in the sewage, helps the enzymatic and microorganism actions actions on the organic components of the sewage liquid. After 10–12 hours of enzymatic action almost all of the sewage organics are converted to a form suitable for ultimate biological conversion to innocuous compounds such as carbon dioxide, water, nitrogen, ammonia, nitrates, sulfates and, in some cases, oxygen. In some variations of the experiment an Amberlite (Rohm and Haas) mixed anion-cation exchange agent of the 10% DVB type, containing unsatisfied $SO_3H^-$ and quaternary ammonium groups, is used to remove harmful ions before enzymatic or microorganism action commences. This may be effected by merely mixing the ion exchange resins of the appropriate type with the liquid sewage or by passing the sewage through a relatively loosely packed bed of the agent. Usually, however, such treatment is not required (and the treated sewage liquid remaining may be discharged to streams or lakes in neutral or substantially neutral state) because most of the potentially interfering ions are removed in the alkaline treating step, with carbonate and/or caustic.

After completion of the enzymatic treatment step, during which, if so desired, additional enzymes may be added to the liquid sewage, such as diastase, urease, papain and other amylases, proteases, lipases, oxidoreductases and hydrolases, the sewage is ready for controlled biological treatment with usefully reactive but substantially non-pathogenic organisms. The organisms added are bacteria but fungi, yeasts, viruses, algae, protozoa, etc. are also used. In the present case the bacteria used include proteus vulgaris, streptomyces, *clostridium butyricum*, nitrobacter, *bacillus casei* and *streptococcus lactis* but various others may also be present. The weight of bacteria present at the start of bacterial action may be from 0.01 to 1% and in the present case is about 0.05% of the solids content of the organic component of the sewage being treated. In addition a similar proportion of fungi and yeasts is used, being mainly composed of *aspergillus niger, saccharomyces cerevisiae* and *penicillium chrysogenum*, or the amounts may be halved so that the bacteria and yeasts present total 0.5% on the basis described above. The temperature of microorganism action on the sewage is maintained at 35° to 40°C. and the pH is about 6. The pH may be lower, e.g., from 3.5 to 6.5 and even lower, to 2.5 when yeasts exclusively are used as the microorganism. Instead of charging fresh bacterial cultures these may be from previous batches of treated sewage, before killing of the bacteria and other organisms used to digest the sewage. The digestion continues for 24 hours, at which time the original sewage contaminants are almost completely converted to innocuous substances, mostly in gaseous form. Then the microorganisms are killed.

Killing of the bacteria and other non-pathogenic organisms used to decompose the sewage is effected by the use of acid, again preferably HCl, and enough is employed to produce a sufficiently low pH to completely destroy the organisms. This pH will usually be lower than 4.5 and is preferably about 3 or less. Killing may be aided by the use of elevated temperatures and in this case the sewage liquid is heated to about 50°C. and is held at that temperature for 4 hours. Then, the killed organisms, now less objectionable pollutants, are either settled out, as in a 48 hour settling operation used, or they may be enzymatically destroyed, in the manner previously described. Before killing of the organisms a portion thereof, about 2%, is removed for use as the inoculum for further sewage treatments.

When settling is complete and the dead microorganisms are removed or recycled back to earlier stages of enzymatic operations in other sewage treatments, the water will usually be clear, and it is so in the present operation. To make sure that there are no organisms left, the water is filtered through a sand bed and the resulting clarified liquid, containing no organic biological contaminants, is neutralized to a pH of 7 with NaOH solution and is treated with a Rohm and Haas Amberlite anion-cation exchange resin of the 10% DVB ($SO_3H^-$ - Quaternary) type. The ion exchange results in a water produced which is of drinking water quality, with only a few parts per million (1–10) of innocuous dissolved salts, having had over 99.5% of the inorganic ions removed. The water contains no live bacteria or other harmful organisms, is sparkling clear in appearance, and can be drunk with safety. After about an hour's operation the ion exchanger is regenerated and it is found that the effluent is of increased salt concentration over that originally charged in the beginning of sewage treatment. The salt is recovered from the ion exchange effluent and is employed to generate acids and bases for use in the process. The other products of the reactions are also salvaged, with dead organisms and organic materials settled out being used for fertilizer, the metal oxides, etc. as a source of heavy metals and in some cases the gases are also recovered.

Variations of the described process are made, changing the temperatures, times, concentrations, pH's, materials employed, etc., within the ranges mentioned in the preceding specification. In such cases, the advantages of the invention are also obtained and speedy production of water of drinking quality from the sewage results. Thus, when temperatures of 25°C. are used throughout the processing, not only in the last settling, neutralization and ion exchange steps as in the preceding example, good results are obtained but the reactions are slower, being as much as 100% longer. Similarly, when reaction times shortened more than described, the purification of the sewage is not as good.

Yet, all processes within the description are operative and are within the present invention.

It will be evident from the foregoing description that a greatly improved process for the treatment of sewage has been described and illustrated. However, it should also be clear that the inventive concepts are broader than the specific embodiments described and the invention covers similar processes in which equivalent materials and operations are also employed, without departing from the basic concept of the invention. Thus, in many applications where it is not necessary to make water of drinking water quality the ion exchange operation may be omitted and neutralized water, usually at a pH in the range of 6 to 8, may be discharged. Such operations are more economical and have been found to be useful when drinking quality water is not needed, as in treatment facilities for human waste in or from the tanks of portable toilets. In some such operations, the wastes may be sterilized with caustic, preferably after an initial acidification treatment, preferably with hydrochloric acid, which makes the caustic sterilization more effective. Then, the rest of the described process, beginning with the enzymatic action, may be effected or, in some cases, the waste may be neutralized and subjected to a solids separation step and the neutralized liquid may be discharged, with the sterilized solids being utilizable as fertilizer, animal feed ingredients or for other suitable purpose. Of course, although the simplified sterilization process described may be useful in some applications, to produce water of drinking quality and to effect the sewage treatment most efficiently the full treatment process will be utilized.

What is claimed is:

1. A method of treating liquid sewage containing inorganic and organic components, including a precipitable metal or mixture of such metals, a material selected from the group consisting of starches, proteins, glycerides and sugars and mixtures thereof, and pathogenic and other bacteria, which comprises adding to the liquid sewage an alkaline compound or a mixure of alkaline compounds selected from the group consisting of alkali metal carbonate, alkali metal bicarbonate and alkali metal hydroxide to precipitate out the precipitable metal of mixture of such metals as insoluble carbonates, bicarbonates, hydroxides or oxides or mixtures thereof, removing the precipitated materials from the rest of the liquid sewage, adding sufficient alkaline material to the sewage to raise the pH thereof to over 11 to destroy pathogenic and other bacteria in the sewage and release enzymes from the bacteria into solution, lowering the pH of the sewage to from 3.5 to 6.5 by the addition of an acidic material, enzymatically digesting a material or materials selected from the group consisting of starches, proteins, glycerides and sugars with the enzymes released from the bacteria, adding seed bacterial, fungal or yeast organisms or a mixture thereof to the sewage to assist in decomposing organic components thereof, acidifying the sewage after substantial decomposition thereof to kill the organisms developed from those seeded, removing the dead organisms and other insoluble materials present and neutralizing the liquid remaining.

2. A method of treating aqueous liquid sewage after removal of insoluble components therefrom by settling, centrifugation, filtration or a combination thereof which comprises adding to the liquid sewage, containing inorganic and organic components, including a precipitatable metal or mixture of such metals, a material selected from the group consisting of starches, proteins, glycerides and sugars and mixtures thereof, and pathogenic and other bacteria an alkaline compound or a mixture of alkaline compounds selected from the group consisting of sodium carbonate, sodium hydroxide and sodium bicarbonate to precipitate out the precipitatable metal or a mixture of such metals as insoluble carbonates, bicarbonates, hydroxides or oxides, removing the precipitated materials from the rest of the liquid sewage, adding sufficient sodium hydroxide or sodium carbonate to the sewage to raise the pH thereof to over 11 to destroy the pathogenic bacteria and to release enzymes from the bacteria into solution in the sewage, lowering the pH to from 3.5 to 6.5 by the addition of hydrochloric acid, so that sodium chloride is produced and is present in the sewage at a concentration of at least 0.01 molar, enzymatically digesting a material or materials selected from the group consisting of starches, proteins, glycerides and sugars with the enzymes released from the bacteria, adding seed bacterial, fungal or yeast organisms or a mixture thereof to the sewage to assist in breaking down and oxidizing organic components thereof, acidifying the sewage after substantially complete oxidation thereof to kill the organisms developed from those seeded, removing the dead organisms and other insoluble materials present and neutralizing the liquid remaining to a pH of about 7 with hydrochloric acid.

3. A method according to claim 2 wherein additions of alkaline compound(s) to precipitate out the metals as insoluble compounds and to raise the pH of the aqueous sewage to over 11 to destroy bacteria are effected simultaneously, after which the insoluble metal compounds are removed by settling and the removal of the metal salts is such that the concentration of any copper left in the sewage is less than 1 part per million, after destruction of the pathogenic bacteria and the release of enzymes from the bacteria into the solution the pH is lowered to from 4 to 6 by addition of hydrochloric acid, sodium chloride is present in the sewage at a concentration of at least 0.01 molar during enzymatic digestion, after substantially complete oxidation of the sewage it is acidified to a pH less than 5 to kill the microorganisms developed, and said dead organisms, any living microorganisms and proteinaceous matter are removed by sedimentation.

4. A method according to claim 3 wherein the alkaline compounds added to precipitate out the metals as insoluble compounds and to raise the pH of the aqueous sewage include sufficient sodium hydroxide to raise the molarity thereof in the aqueous sewage to from 0.01 to 0.5, and raise the pH of the sewage to from 12 to 13.5, the accompanying reaction and separation take place at a temperature from 10°C. to 50°C. for a time from one hour to 24 hours, starch cells are broken down in the high pH medium in said reaction and in settling, the lowering of pH of the sewage solution, less separated precipitated materials, is to from 4.5 to 5.5 and is effected by the addition of enough hydrochloric acid to increase the molarity of the chloride in the aqueous solution to from 0.05 to 0.5 molar, enzymatic digestion is effected at a temperature of 30° to 60°C. for a period from ½ hour to 12 hours, with enzymes present being selected from the group consisting of amylotic, cellulotic and proteolytic enzymes, papain, glucose oxidases, lipases and bromelain, the organisms added to the enzyme-treated sewage are aerobic or anaerobic and the treatment of the sewage with them takes place over a period of 12 to 36 hours, during which the temperature of the sewage is maintained in the range of 25° to 50°C., the pH is regulated to promote best growth of the organisms seeded, being in the range of 5 to 9, the organisms developed from the seeded organisms are killed at a pH less than 4.5 by the addition of HCl at a concentration greater than 0.005 molar, and sedimentation occurs at a temperature of 20° to 50°C. over a period of from 6 to 48 hours.

5. A method according to claim 4 wherein seeding organisms utilized include *Aspergillus niger*, the precipitated metal compound is salvaged for its metal value and the killed organisms developed from the seeded organisms are nonpathogenic and are recovered for use as fertilizer.

6. A method according to claim 5 wherein enzymes are added to those released from bacteria killed by alkaline treatment, so as to speed the enzymatic attack and digestion of the starches, proteins, glycerides, and sugars.

7. A method of treating liquid sewage containing inorganic and organic components, including a precipitatable metal, a material selected from the group consisting of starches, proteins, glycerides and sugars and mixtures thereof, and pathogenic and other bacteria which comprises the sequence of: adding to the liquid sewage an alkaline compound selected from the group consisting of alkali metal carbonates, alkali metal bicarbonatees and alkali metal hydroxides and mixtures thereof, which includes the addition of an alkali metal carbonate, to precipitate out the precipitatable metal as a material selected from the group consisting of insoluble carbonates, bicarbonates, hydroxides and oxides and mixtures thereof; removing the precipitated material from the rest of the liquid sewage; when the pH of such rest of the sewage is below 11 adding sufficient alkaline material to the sewage to raise the pH thereof to over 11 to destroy the pathogenic and other bacteria in the sewage and release enzymes from the bacteria into solution in the sewage; lowering the pH of the sewage to from 3.5 to 6.5 by the addition of an acidic material; enzymatically digesting a material selected from the group consisting of starches, proteins, glycerides and sugars, and mixtures thereof, present in the sewage, with the enzymes released from the bacteria; adding seed organisms selected from the group consisting of bacterial, fungal and yeast organisms and mixtures thereof to the sewage to assist in decomposing organic components thereof; acidifying the sewage after substantial decomposition thereof to kill the organisms developed from those seeded; removing the dead organisms and other insoluble materials present; and neutralizing the liquid remaining.

8. A method according to claim 7 wherein the alkaline compound or mixture of such compounds added to the liquid sewage is selected from the group consisting of (1) sodium carbonate and (2) sodium carbonate and sodium hydroxide, the alkaline material employed to raise the pH after removal of precipitated material from the liquid sewage is selected from the group consisting of sodium hydroxide, sodium carbonate and mixtures thereof, the acidic material used to lower the pH to the 3.5 to 6.5 range is hydrochloric acid, such addition produces sodium chloride at a concentration of at least 0.01 molar, and the liquid remaining after killing of the organisms and removal of them and the insoluble materials from the liquid is neutralized to a pH of about 7 with hydrochloric acid.

\* \* \* \* \*